(12) United States Patent
Lyonnet et al.

(10) Patent No.: US 11,467,134 B2
(45) Date of Patent: Oct. 11, 2022

(54) ELECTRONIC DEVICE AND METHOD FOR SIMULATING AN ULTRASONIC RESPONSE OF A METAL PART, ASSOCIATED TESTING ELECTRONIC SYSTEM AND METHOD AND COMPUTER PROGRAM

(71) Applicant: FRAMATOME, Courbevoie (FR)

(72) Inventors: Florian Lyonnet, Paris (FR); Marie-Françoise Cugnet, Montmélian (FR); Didier Cassereau, Clamart (FR)

(73) Assignee: FRAMATOME, Courbevoie (FR)

( * ) Notice: Subject to any disclaimer, the term of this patent is extended or adjusted under 35 U.S.C. 154(b) by 258 days.

(21) Appl. No.: 16/763,415

(22) PCT Filed: Nov. 13, 2018

(86) PCT No.: PCT/EP2018/081118
§ 371 (c)(1),
(2) Date: May 12, 2020

(87) PCT Pub. No.: WO2019/092285
PCT Pub. Date: May 16, 2019

(65) Prior Publication Data
US 2021/0072198 A1 Mar. 11, 2021

(30) Foreign Application Priority Data
Nov. 13, 2017 (FR) ..................... 17 60661

(51) Int. Cl.
*G01N 29/44* (2006.01)
*G01N 29/04* (2006.01)
(Continued)

(52) U.S. Cl.
CPC ......... *G01N 29/4472* (2013.01); *G01N 29/04* (2013.01); *G01N 29/30* (2013.01);
(Continued)

(58) Field of Classification Search
CPC .... G01N 29/4472; G01N 29/04; G01N 29/30; G01N 29/4418; G01N 2291/0289; G21C 17/00; Y02E 30/30
(Continued)

(56) References Cited

U.S. PATENT DOCUMENTS 7,822,573 B2 * 10/2010 Ihn ..................... G01N 29/4418
73/579
7,991,587 B2 * 8/2011 Ihn ..................... G01N 29/223
702/183
(Continued)

FOREIGN PATENT DOCUMENTS

EP          0319623       *  6/1989
JP          H09318608 A      12/1997
(Continued)

OTHER PUBLICATIONS

Corresponding Search Report PCT/EP2018/081118.
(Continued)

*Primary Examiner* — Jacques M Saint Surin
(74) *Attorney, Agent, or Firm* — Davidson, Davidson & Kappel, LLC

(57) ABSTRACT

A method for simulating an ultrasonic response of a metal part is carried out by an electronic simulating device. The method includes computing a first distribution of ultrasonic
(Continued)

waves for the part without defect, in response to an ultrasonic excitation toward said part computing a second distribution of ultrasonic waves for a predefined zone ($S_3^k$) of the part, including a defect (20), in response to an ultrasonic excitation toward said zone ($S_3^k$), with the computation of elementary distributions, each corresponding to an ultrasonic response received by a receiver located at a border (F) of said zone; and determining a resultant distribution of ultrasonic waves for the part with defect, from the first and second computed distributions, the resultant distribution forming a simulation of an ultrasonic response received from the part including the defect (20), in response to an ultrasonic excitation toward said part.

11 Claims, 5 Drawing Sheets

(51) Int. Cl.
  *G01N 29/30* (2006.01)
  *G21C 17/00* (2006.01)
(52) U.S. Cl.
  CPC ......... *G01N 29/4418* (2013.01); *G21C 17/00* (2013.01); *G01N 2291/0289* (2013.01)
(58) Field of Classification Search
  USPC .......................................... 702/39
  See application file for complete search history.

(56) References Cited

U.S. PATENT DOCUMENTS

| | | | |
|---|---|---|---|
| 9,989,500 B2* | 6/2018 | Mooshofer | ............ G01N 29/44 |
| 2006/0288756 A1* | 12/2006 | De Meurechy | .... G01N 29/2418 |
| | | | 73/1.01 |
| 2010/0299095 A1 | 11/2010 | Ihn | |
| 2017/0343516 A1 | 11/2017 | Matsunaga et al. | |

FOREIGN PATENT DOCUMENTS

| | | |
|---|---|---|
| JP | 2000352563 A | 12/2000 |
| JP | 2005106654 | 4/2005 |
| JP | 2005140575 A | 6/2005 |
| WO | WO2016092869 A1 | 6/2016 |

OTHER PUBLICATIONS

Subair S. Mohamed et al. "Finite Element Simulations to Predict Probability of Detection (PoD) Curves for Ultrasonic Inspection of Nuclear Components", Procedia Engineering, ElSevier, Amsterdam, NL, vol. 86, Dec. 17, 2014.

Tang Qixiang et al.: "Finite Element Simulation of Ultrasonic Waves in Corroded Reinforced Concrete for Early Stage Corrosion Detection", Spie Defense and Security Symposium; Mar. 16-20, 2008: Orlando, FL, vol. 101699, Apr. 19, 2017, pp. N-1-N-9.

Shan Lin et al. "Development of Hybrid Method between Finite Element Method and Geometrical Theory for Propagation Simulation of Ultrasonic Waves", Central Research Institute of Electric Power Industry, pp. 1-9.

* cited by examiner

ELECTRONIC DEVICE AND METHOD FOR SIMULATING AN ULTRASONIC RESPONSE OF A METAL PART, ASSOCIATED TESTING ELECTRONIC SYSTEM AND METHOD AND COMPUTER PROGRAM

The present disclosure relates to a method for simulating an ultrasonic response of a metal part, the method being carried out by an electronic simulating device.

The present disclosure also relates to a non-transitory computer-readable medium including a computer program including software instructions which, when executed by a computer, implement such a simulating method.

The present disclosure also relates to a method for inspecting a metal part, comprising the determination of an ultrasonic response of the metal part, via an inspection system including at least one ultrasonic transmitter and at least one ultrasonic receiver; the simulation of an ultrasonic response of the metal part, via the implementation of such a simulation method; and the identification of any defect in the metal part by comparison of the determined and simulated ultrasonic responses of the metal part. These defects can be defects contained within the metal part, defects also called core defects, or defects emerging on the inner or outer surfaces of the metal part.

The present disclosure also relates to an electronic device for simulating an ultrasonic response of a metal part. The present disclosure also relates to an electronic system for inspecting the metal part.

The present disclosure in particular relates to the case where the metal part is a cladding intended to surround nuclear fuel pellets in a nuclear reactor core, and then relates to the manufacture of nuclear fuel assemblies.

The present disclosure for example applies to light water nuclear reactors, whether using pressurized water or boiling water.

BACKGROUND

A large number of these nuclear reactors are currently used around the world.

In a nuclear fuel assembly, the fissile material is contained in a sealed metal tube. This tube is a critical element in terms of safety; each tube therefore undergoes several quality inspections. One of the inspections done at the end of manufacturing is an automated ultrasonic inspection seeking geometric defects of the tube. This nondestructive inspection is done according to the international standards in force, and it is then desirable to improve the selectivity of the inspection, that is to say, to reject only the tubes having defects exceeding predefined criteria and to accept all other tubes. The use of a method for simulating an ultrasonic response then seeks to improve this selectivity of the inspection.

Today, in most cases, the analysis of industrial ultrasonic test results generally provides qualitative information that does not make it possible to connect the signals received by the ultrasonic sensor(s) to the geometry of the defects. As a result, the tubes may be rejected even though the actual geometry of the defects would not be considered dangerous if it was known.

Methods for simulating an ultrasonic response of a metal part exist. These simulating methods for example implement semi-analytical methods, such as the Rayleigh integral or the pencil method, or discrete methods, such as the finite difference method or the finite element method.

SUMMARY

However, the limiting factor of such simulation methods is the computing time to obtain the simulated response of a metal part with an arbitrary three-dimensional geometric defect.

One aim of the present disclosure is to solve this problem by providing a method and an electronic device for simulating an ultrasonic response of the metal part, making it possible to decrease the necessary computing time.

To that end, a method is provided for simulating an ultrasonic response of a metal part, the method being carried out by an electronic simulating device and comprising the following steps:

computing a first distribution of ultrasonic waves for the metal part without defect, the first distribution forming a simulation of an ultrasonic response received by an ultrasonic sensor from the metal part when it does not include any defect, in response to the emission of a pulsed ultrasonic excitation toward said part;

computing a second distribution of ultrasonic waves for a predefined zone associated with the metal part, the predefined zone including a defect of the metal part, the second distribution forming a simulation of an ultrasonic response received by the ultrasonic sensor from the predefined zone, in response to the emission of an ultrasonic excitation toward said zone, the computation of the second distribution including the computation of a plurality of elementary distributions, each elementary distribution corresponding to an ultrasonic response received by a receiver located at the border of the predefined zone, in response to the emission of a pulsed ultrasonic excitation from an elementary source located at the border of the predefined zone;

determining a resultant distribution of ultrasonic waves toward the metal part with defect, from the first and second computed distributions, the resultant distribution forming a simulation of an ultrasonic response received by the ultrasonic sensor from the metal part including the defect, in response to the emission of an ultrasonic excitation toward said part including the defect.

According to other advantageous aspects of the invention, the simulation method comprises one or more of the following features, considered alone or according to any technically possible combinations:

each elementary distribution is computed from a Green's transfer function over a computational domain restricted to the predefined zone, and for which the source and the receiver are located at the border of said zone;

each elementary distribution verifies the following equation:

$$v_i^B(r, t) = \int_F (H_{ni}(r', r, t) * v_n^A(r', t) - t_n^A(r', t) * G_{ni}(r', r, t)) \cdot dF$$

where $v_i^B(r,t)$ represents a component in the direction i of the particular speed at the point r in a state B in the presence of the defect, F represents the border of the predefined zone, $H_{ni}(r',r,t)$ represents a component in the direction i of a traction vector on the border F at the point r' generated by an excitation from a speed pulse source with direction n at point r, $v_n^A(r',t))$ represents a component in direction n of the particular speed at point r' in state A, $t_n^A(r',t)$ represents a component in direction n of the traction on the border F at point r' in a state A without defect, $G_{ni}(r',r,t)$ is a Green's transfer function representing a component in the direction i of the speed at the point r' generated by an excitation from a speed pulse source with direction n at point r, and the '*' symbols represent the time convolution operator;

the resultant distribution is determined by applying Auld's reciprocity relation to the first and second computed distributions;

the resulting distribution verifies the following equation:

$$R^B(t) = hR^A(t)*E(t) + R^{Diff}(t)$$

where $$R^{Diff}(t) = -\frac{1}{2 \cdot I_0} \int_F (ht_i^A(r',t)*v_i^B(r',t) - t_i^B(r',t)*hv_i^A(r',t)) \cdot dF$$

represents the contribution of the defect to the signal received by the sensor with $R^B(t)$ representing the electrical signal measured on reception by the sensor, for the metal part in a state B when a defect is present, $hR^A(t)$ representing the pulse response of the received electrical signal, in a state A without defect, E(t) representing the excitation electrical signal of the sensor, $ht_i^A(r',t)$ representing the pulse response for the component in a direction i of the traction on the border F at the point r', in the state A, $v_i^B(r',t)$ representing a component in the direction i of the particular speed at the point r', in the state B, $t_i^B(r',t)$ representing a component in the direction i of the traction on the border F at the point r', in the state B, $hv_i^A(r',t)$ representing the pulse response for the component in the direction i of the particular speed at the point r', in the state A, $I_0$ representing a normalization constant specific to the sensor a to an amplification system of the signal, and the '*' symbols represent the time convolution operator;

the method further comprises generating a library of second distributions for a plurality of defects in the metal part and orientations of the pulse ultrasonic excitation emission, each second distribution being computed for a respective defect of the metal part; and the metal part is a cladding designed to surround nuclear fuel pellets in a nuclear reactor core.

A non-transitory computer-readable medium including a computer program is also provided including software instructions which, when executed by a computer, implement a simulation method as defined above.

A method is also provided for inspecting a metal part, comprising the following steps:
  determining an ultrasonic response of the metal part, via an ultrasonic sensor;
  simulating ultrasonic response of the metal part, via the implementation of a simulating method as defined above; and
  identifying any defect in the metal part by comparison of the determined and simulated ultrasonic responses of the metal part.

An electronic device is also provided for simulating an ultrasonic response of a metal part, the electronic simulating device comprising:
  a first computing module configured to compute a first distribution of ultrasonic waves for the metal part without defect, the first distribution forming a simulation of an ultrasonic response received by an ultrasonic sensor from the metal part when it does not include any defect, in response to the emission of an ultrasonic excitation toward said part;
  a second computing module configured to compute a second distribution of ultrasonic waves for a predefined zone associated with the metal part, the predefined zone including a defect of the metal part, the second distribution forming a simulation of an ultrasonic response received by the ultrasonic sensor from the predefined zone, in response to the emission of an ultrasonic excitation toward said zone,
  the second computing module being configured to compute a plurality of elementary distributions, each elementary distribution corresponding to an ultrasonic response received by a receiver located at the border of the predefined zone, in response to the emission of an ultrasonic excitation from an elementary source located at the border of the predefined zone;
  a determining module configured to determine a resultant distribution of ultrasonic waves toward the metal part with defect, from the first and second computed distributions, the resultant distribution forming a simulation of an ultrasonic response received by the ultrasonic sensor from the metal part including the defect, in response to the emission of an ultrasonic excitation toward said part including the defect.

An electronic system is also provided for inspecting a metal part, the electronic inspection system comprising:
  an electronic determining device configured to determine an ultrasonic response of the metal part, from an ultrasonic sensor;
  an electronic simulating device configured to simulate an ultrasonic response of the metal part;
  an electronic identification device configured to identify any defect in the metal part by comparison of the determined and simulated ultrasonic responses of the metal part,
  wherein the electronic simulating device is as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
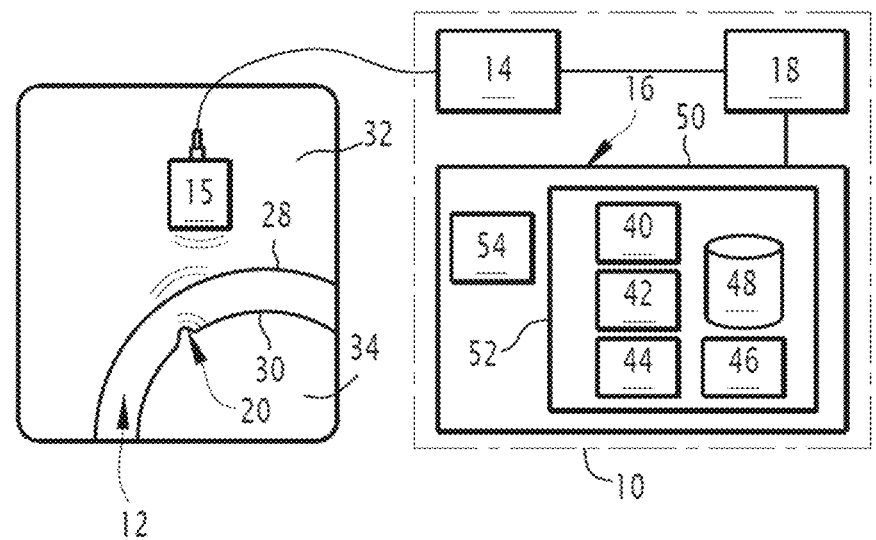
FIG. 1 is a schematic illustration of an electronic device for inspecting a metal part, the system comprising an electronic device for determining an ultrasonic response of a metal part, from an ultrasonic sensor, an electronic device for simulating an ultrasonic response of the metal part and an electronic device for identifying any defect in the metal part by comparing the determined and simulated ultrasonic responses of the metal part.

In FIG. 1, an electronic inspection system 10 is configured to inspect a metal part 12, and comprises an electronic determining device 14 configured to determine an ultrasonic response of the metal part 12, from an ultrasonic sensor 15.

The electronic control system 10 further comprises an electronic simulation device 16 configured to simulate an ultrasonic response of the metal part 12, and an electronic identification device 18 configured to identify any defect 20 in the metal part 12 by comparison of the determined and simulated ultrasonic responses of the metal part 12.

The electronic control system 10 is in particular configured to control a cladding 22 designed to surround nuclear fuel pellets in a nuclear reactor 26 core 24, as will be described in more detail in light of FIGS. 2 and 3. One skilled in the art will then understand that in this case, the metal part 12 inspected by the inspection system 10 is the cladding 22.

Figures 6, 7:
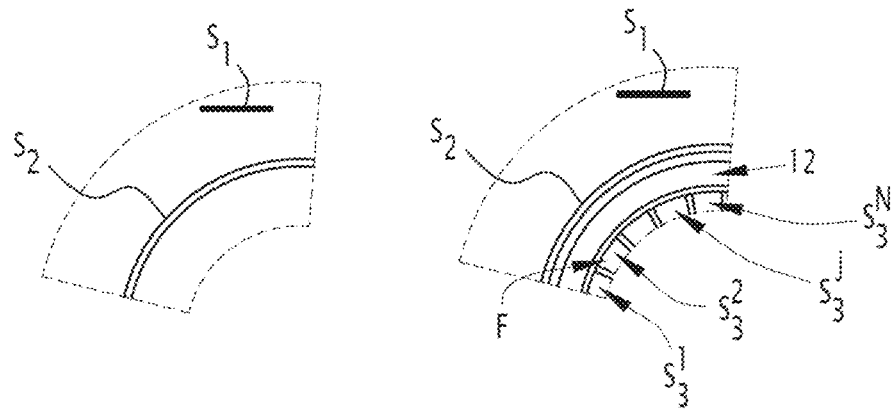
FIGS. 6 and 7 are two-dimensional views illustrating the computation of a first distribution of ultrasonic waves for a healthy metal part, in order to simulate an ultrasonic response received from the metal part when it does not include any defect.
Figure 8:
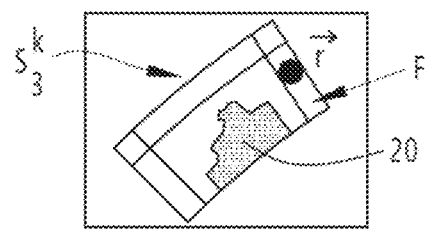
FIGS. 8 and 9 are two-dimensional views illustrating the computation of a second distribution of ultrasonic waves for a predefined zone associated with the metal part, the predefined zone including a defect, in order to simulate an ultrasonic response received from the zone including the defect.
Figure 9:
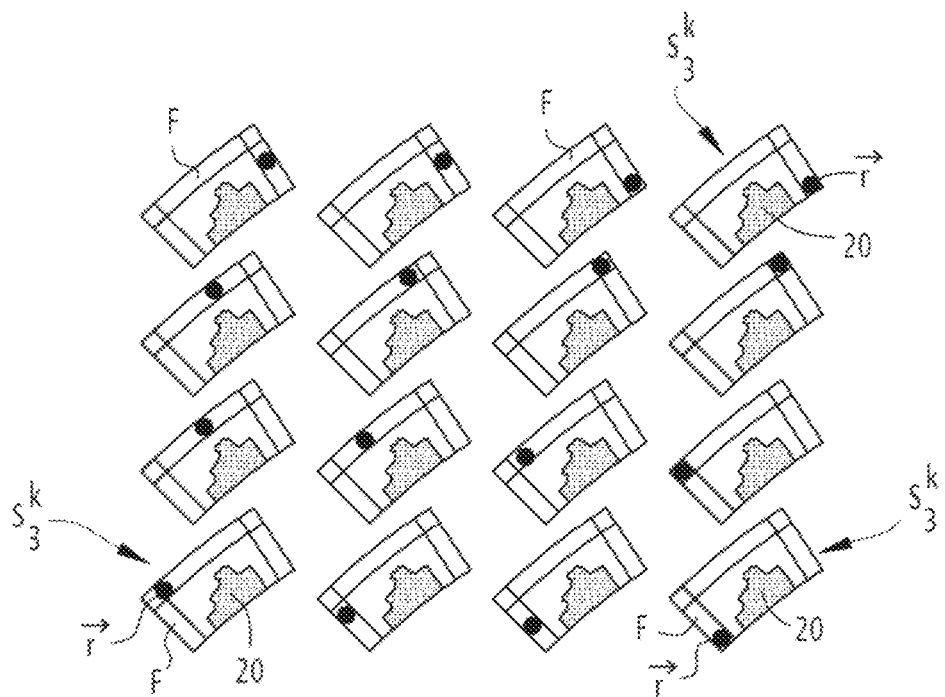

The metal part 12 is for example cylindrical or planar, such as a tube, a bar or a metal plate. The metal part 12 preferably has a regular geometry in that the metal part 12 can be broken down into sub-volumes $S_3^j$, $S_3^k$ with substantially identical shapes and mechanical properties. Each sub-volume $S_3^j$, $S_3^k$, visible in FIGS. 7 to 9, is delimited by a respective border F.

The metal part 12 includes an outer surface 28 oriented toward the ultrasonic sensor 15 and an inner border 30. In the example of FIG. 1, the outer surface 28 is in contact with a liquid 32, such as water, and the inner surface 30 is in contact with another liquid or gaseous fluid 34, such as air.

In the example of FIG. 1, the electronic determining device 14 is connected to the ultrasonic sensor 15 suitable for both sending a pulsed ultrasonic excitation toward the metal part 12 and for receiving an ultrasonic response from the metal part 12, in response to the emission of an ultrasonic excitation toward said metal part 12. In a variant that is not shown, the electronic determining device 14 is connected on the one hand to the ultrasonic sensor 15 forming only an ultrasonic receiver, and on the other hand to an ultrasonic transmitter separate from the ultrasonic sensor 15.

The electronic determining device 14 is then configured to command the sending of a pulsed ultrasonic excitation toward the metal part 12, then for acquiring the ultrasonic response received via the ultrasonic sensor 15 from the metal part 12. One skilled in the art will further understand that when the electronic determining device 14 controls the sending of a pulsed ultrasonic excitation toward a partial zone of the metal part 12, then acquires the ultrasonic response received via the ultrasonic sensor 15 from said partial zone of the metal part 12, the electronic determining device 14 is further configured to assemble the ultrasonic responses from the separate partial zones of the metal part 12, in order to determine the overall ultrasonic response of the metal part 12. As an example, the overall ultrasonic response is in the form of a map, such as a representation of the maximums of the ultrasonic responses of each partial zone of the metal part 12.

In the example of FIG. 1, the ultrasonic sensor 15, or even additionally the ultrasonic transmitter, is arranged in the liquid 32.

The electronic simulating device 16 comprises a first computing module 40 configured to compute a first distribution of ultrasonic waves for the metal part 12 without defect, in order to simulate a received ultrasonic response of the metal part 12 when it does not include any defect.

The electronic simulating device 16 comprises a second computing module 42 configured to compute a second distribution of ultrasonic waves for a predefined zone $S_3^k$ associated with the metal part 12, the predefined zone $S_3^k$ (visible in FIGS. 8 and 9) including a defect 20 of the metal part 12, in order to simulate a received ultrasonic response of the predefined zone $S_3^k$ that includes the defect 20.

The electronic simulating device 16 comprises a determining module 44 configured to determine a resultant distribution of ultrasonic waves for the metal part 12 with defect, from the computed first and second distributions, in order to simulate a received ultrasonic response of the metal part 12 when it includes the defect 20.

As an optional addition, the electronic simulating device 16 comprises a generating module 46 configured to generate a library 48 of second distributions for a plurality of defects 20 in the metal part 12 and orientations of the pulse ultrasonic excitation emission, each second distribution being computed for a respective defect 20 of the metal part 12.

In the example of FIG. 1, the electronic simulating device 16 includes an information processing unit 50, for example made up of a memory 52 associated with a processor 54.

In the example of FIG. 1, the first computing module 40, the second computing module 42, the determining module 44 and, as an optional addition, the generating module 46 are each made in the form of software executable by the processor 54. The memory 52 is then able to store first software for computing the first ultrasonic wave distribution of the metal part 12 without defect, second software for computing the second ultrasonic wave distribution for the predefined zone $S_3^k$ including the defect 20 of the metal part 12, software for determining the resultant distribution of ultrasonic waves for the metal part 12 with defect, from the computed first and second distributions, and, as an optional addition, software for generating the library 48 of second distributions for a plurality of defects 20 in the metal part 12 and orientations for the ultrasonic excitation emission. The processor 54 of the information processing unit 50 is then able to execute the first calculating software, the second calculating software, the determining software and, optionally and additionally, the generating software.

In a variant that is not shown, the first calculating module 40, the second calculating module 42, the determining module 44 and, optionally and additionally, the generating module 46 are each made in the form of a programmable logic component, such as an FPGA (Field Programmable Gate Array), or in the form of a dedicated integrated circuit, such as an ASIC (Application-Specific Integrated Circuit).

The electronic identification device 18 configured to identify any defect 20 in the metal part 12 by comparison of the determined and simulated ultrasonic responses of the metal part 12, in particular to correlate a simulated ultrasonic response for a predetermined defect 20 with the ultrasonic response determined by the electronic determining device 14.

In other words, the electronic identification device 18 makes it possible to associate the ultrasonic response received by the ultrasonic sensor 15 with the geometry of a defect 20, the ultrasonic response of which has been simulated by the electronic simulating device 16.

The defect 20 is located in the core of the metal part 12, that is to say, inside the metal part 12, or emerges relative to the metal part 12.

The first computing module 40 is configured to compute a first distribution of ultrasonic waves for the metal part 12 without defect, the first distribution forming a simulation of an ultrasonic response received by an ultrasonic sensor 15 from the metal part 12 when it does not include any defect, in response to the emission of an ultrasonic excitation toward said part 12.

The computation of the first distribution by the first computing module 40 is known in itself, and will be described in more detail hereinafter in light of FIGS. 6 and 7.

The second computing module 42 is configured to compute the second distribution of ultrasonic waves for the predefined zone $S_3^k$ associated with the metal part 12, the second distribution forming a simulation of an ultrasonic response received by the ultrasonic sensor 15 from the predefined zone $S_3^k$, in response to the emission of an ultrasonic excitation toward said zone $S_3^k$.

The second computing module 42 is then configured to compute a plurality of elementary distributions, each elementary distribution corresponding to an ultrasonic response received by a receiver located at the border F of the predefined zone $S_3^k$, in response to the emission of an ultrasonic excitation from an elementary source r located at the border F of the predefined zone $S_3^k$, as will be described in more detail hereinafter in light of FIGS. 8 and 9. In the remainder of the present disclosure, the elementary source will be interchangeably denoted r or $\vec{r}$.

The second computing module 42 is configured to compute each elementary distribution from a Green's transfer function over a computational domain restricted to the predefined zone $S_3^k$, and for which the elementary source r and the receiver r' are located at the border F of said zone $S_3^k$.

The second computing module 42 is for example configured to compute each elementary distribution via the following equation:

$$v_i^B(r,t) = \int_F (H_{ni}(r',r,t) * v_n^A(r',t) - t_n^A(r',t) * G_{ni}(r',r,t)) \cdot dF \quad (1)$$

where $v_i^B(r,t)$ represents a component in the direction i of the particular speed at the point r in a state B in the presence of the defect, F represents the border of the predefined zone $S_3^k$, $H_{ni}(r',r,t)$ represents a component in the direction i of a traction vector on the border F at the point r' generated by an excitation from a speed pulse source with direction n at point r, $v_n^A(r',t)$ represents a component in direction n of the particular speed at point r' in state A, $t_n^A(r',t)$ represents a component in direction n of the traction on the border F at point r' in a state A without defect, $G_{ni}(r',r,t)$ is a Green's transfer function representing a component in the direction i of the speed at the point r' generated by an excitation from a speed pulse source with direction n at point r, and the '*' symbols represent the time convolution operator.

The determining module 44 is configured to determine the resultant distribution of ultrasonic waves toward the metal part 12 with the defect 20, from the first and second computed distributions, the resultant distribution forming a simulation of an ultrasonic response received by the ultrasonic sensor 15 from the metal part 12 including the defect 20, in response to the emission of an ultrasonic excitation toward said part 12 including the defect 20.

The determining module 44 is preferably configured to determine the resultant distribution is determined by applying Auld's reciprocity relation to the first and second computed distributions.

The determining module 44 is for example configured to determine the resultant distribution $R^B(t)$ according to the following equation:

$$R^B(t) = hR^A(t) * E(t) + R^{Diff}(t) \quad (2)$$

$$R^{Diff}(t) = -\frac{1}{2 \cdot I_0} \int_F (ht_i^A(r',t) * v_i^B(r',t) - t_i^B(r',t) * hv_i^A(r',t)) \cdot dF \quad (3)$$

with where $R^{Diff}(t)$ represents the contribution of the defect 20 to the signal received by the ultrasonic sensor 15, with $R^B(t)$ representing the electrical signal measured on reception by the ultrasonic sensor 15, for the metal part 12 in a state B when the defect 20 is present, $hR^A(t)$ representing the pulse response of the received electrical signal, in a state A without defect, E(t) representing the excitation electrical signal of the ultrasonic sensor 15, $ht_i^A$ representing the pulse response for the component in a direction i of the traction on the border F at the point r', in the state A, $v_i^B(r',t)$ representing a component in the direction i of the particular speed at the point r', in the state B, $t_i^B(r',t)$ representing a component in the direction i of the traction on the border F at the point r', in the state B, $hv_i^A(r',t)$ representing the pulse response for the component in the direction i of the particular speed at the point r', in the state A, $I_0$ representing a normalization constant specific to the ultrasonic sensor 15 a to an amplification system of the signal, and the '*' symbols represent the time convolution operator.

The generating module 46 is configured to generate the library 48 of second distributions for a plurality of defects 20 in the metal part 12 and for a plurality of orientations of the pulse ultrasonic excitation emission, each second distribution being computed for a respective defect 20 and for a respective emission orientations. Each emission orientation is the orientation of an emission direction of a corresponding pulsed ultrasonic excitation, emitted by the ultrasonic sensor 15 or, in a variant, by the ultrasonic transmitter separate from the ultrasonic sensor 15.

Figure 2:
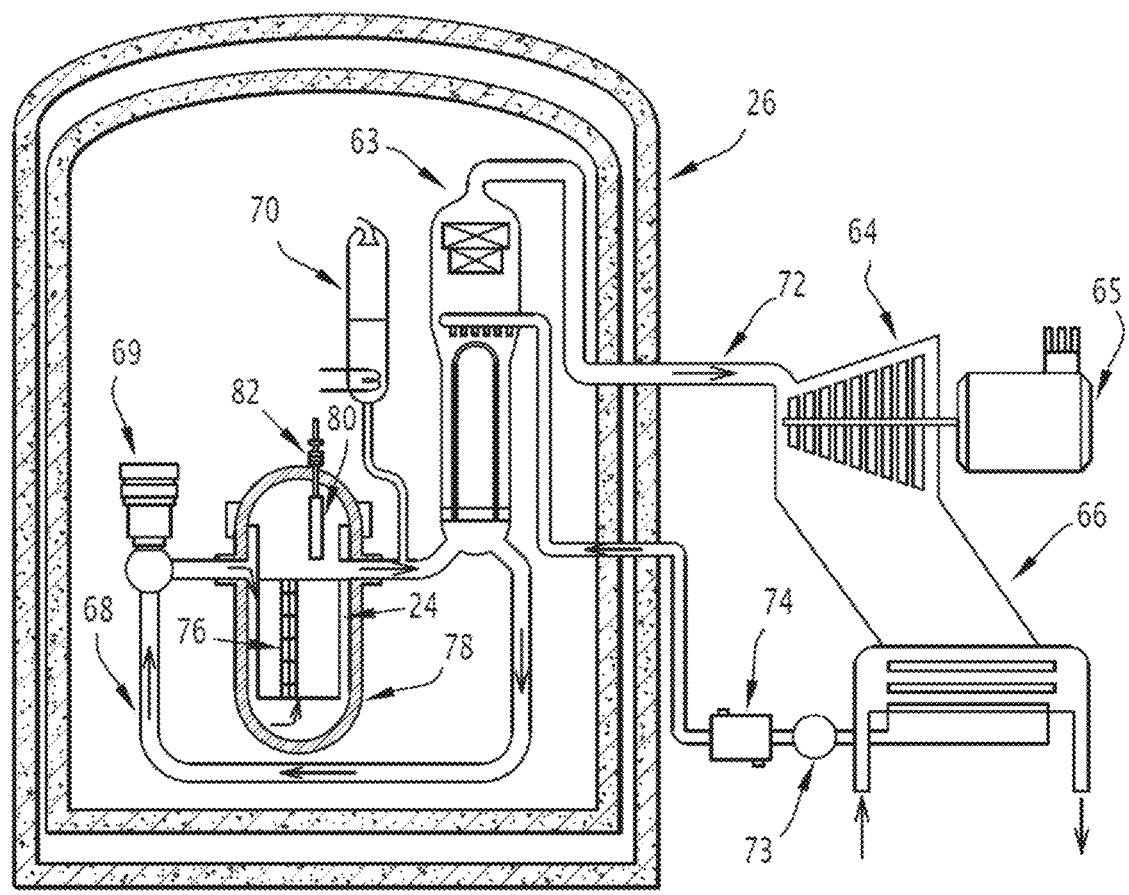
FIG. 2 is a schematic view illustrating a pressurized water nuclear reactor, the metal part inspected by the inspection system of FIG. 1 for example being a cladding designed to surround nuclear fuel pellets in a nuclear reactor core.

In FIG. 2, the nuclear reactor 26, such as a pressurized water nuclear reactor, comprises, as is known in itself, the core 24, a steam generator 63, a turbine 64 coupled to an electrical energy generator 65, and a condenser 66.

The nuclear reactor 26 comprises a primary circuit 68 equipped with a pump 69 and in which pressurized water circulates, along a path embodied by the arrows in FIG. 2. This water in particular rises through the core 24 to be heated therein while providing the refrigeration of the core 24.

The primary circuit 68 further comprises a pressurizer 70 making it possible to pressurize the water circulating in the primary circuit 68.

The water of the primary circuit 68 also supplies the steam generator 63, where it is cooled while providing the vaporization of water circulating in a secondary circuit 72.

The steam produced by the steam generator 63 is channeled by the secondary circuit 72 toward the turbine 64, then toward the condenser 66, where this steam is condensed by indirect heat exchange with the cooling water circulating in the condenser 66.

The secondary circuit 72 comprises, downstream from the condenser 66, a pump 73 and a heater 74.

Traditionally, the core 24 comprises fuel assemblies 76 that are loaded in a vessel 78 according to a loading pattern. A single fuel assembly 76 is shown in FIG. 2, but the core 24 for example comprises 157 fuel assemblies 76.

The nuclear reactor 26 comprises control clusters 80 that are positioned in the vessel 78 above certain fuel assemblies 76. A single control cluster 80 is shown in FIG. 2, but the core 24 for example comprises around sixty control clusters 80.

The control clusters 80 are movable by mechanisms 82 to be inserted into the fuel assemblies 76 that they overhang.

Traditionally, each control cluster 80 comprises rods, at least some of which include a material absorbing the neutrons.

Thus, the vertical movement of each control cluster 80 makes it possible to adjust the nuclear reactivity of the reactor 26 and allows variations of the overall power P supplied by the core 24 from the nil power to the nominal power PN, as a function of the pushing of the control clusters 80 into the fuel assemblies 76.

Figure 3:
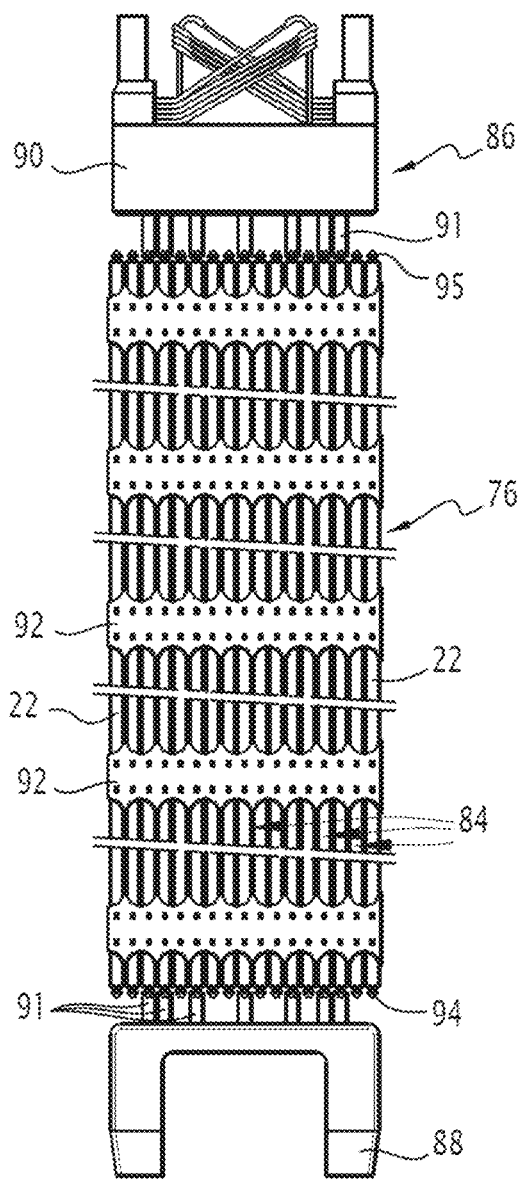
FIG. 3 is a lateral schematic view of a fuel assembly of the core of the reactor of FIG. 2.

As illustrated by FIG. 3, each fuel assembly 76 traditionally comprises an array of nuclear fuel rods 84 and a support skeleton 86 for the fuel rods 84.

The skeleton 86 traditionally comprises a lower end-piece 88, an upper end-piece 90, an array of guide tubes 91 connecting the two end-pieces 88 and 90 and designed to receive the rods of the control clusters 80 and to position spacer-forming grids 92 to position the arrays of fuel rods 84 and guide tubes 91.

Each fuel rod 84 conventionally comprises the cladding 22 in the form of a tube closed at its lower end by a lower stopper 94 and at its upper end by an upper stopper 95. The fuel rod 84 comprises a series of pellets, not shown, stacked inside the cladding 22 and bearing against the lower stopper 94. A maintaining spring, not shown, is positioned in the upper segment of the cladding 22 to bear on the upper stopper 95 and on the upper pellet.

Conventionally, the pellets have a base of fissile material, for example uranium oxide, and the cladding 22 is made from zirconium alloy.

Figure 4:
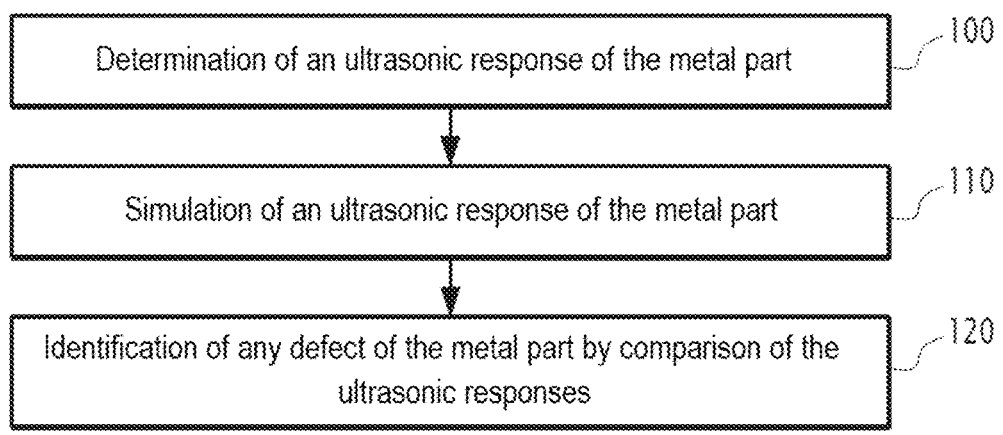
FIG. 4 is a flowchart of a method, according to an embodiment of the invention, for inspecting a metal part, comprising the determination of the ultrasonic response of the metal part, via an ultrasonic sensor, the simulation of an ultrasonic response of the metal part, and the identification of any defect in the metal part by comparison of the determined and simulated ultrasonic responses of the metal part.

The operation of the electronic inspection system 10 will now be explained using FIG. 4 showing an organizational chart of the method, according to an embodiment of the invention, for inspecting the metal part 12.

During an initial step 100, the electronic inspection device 10 determines, via its determining device 14 and the ultrasonic sensor 15, the ultrasonic response of the metal part 12 that is being inspected. This determination of the ultrasonic response, received by the ultrasonic sensor 15, of the inspected metal part 12 is known in itself.

The electronic inspection system 10 simulates, during the following step 110 and via its simulating device 16, the ultrasonic response of the metal part 12, this simulation being done through the implementation of the simulation method according to an embodiment of the invention, which will be described in more detail hereinafter using FIG. 5.

The electronic inspection system 10 lastly identifies, during step 120 and via its identification device 18, any defect 20 in the metal part 12 by comparison of the ultrasonic response determined during step 100 and the ultrasonic response simulated during step 110.

This identification step 120 of any defect 20 is for example done by correlation of the ultrasonic response simulated during step 110 with the ultrasonic response determined during step 100, so as to deduce therefrom whether the ultrasonic response determined from the examined metal part 12 corresponds to the ultrasonic response simulated with the defect 20. In other words, this identification step 120 seeks to connect the ultrasound response received by the ultrasonic sensor 15 during step 100 to the geometry of a defect 20 whose ultrasonic response has been simulated during step 110.

Figure 5:
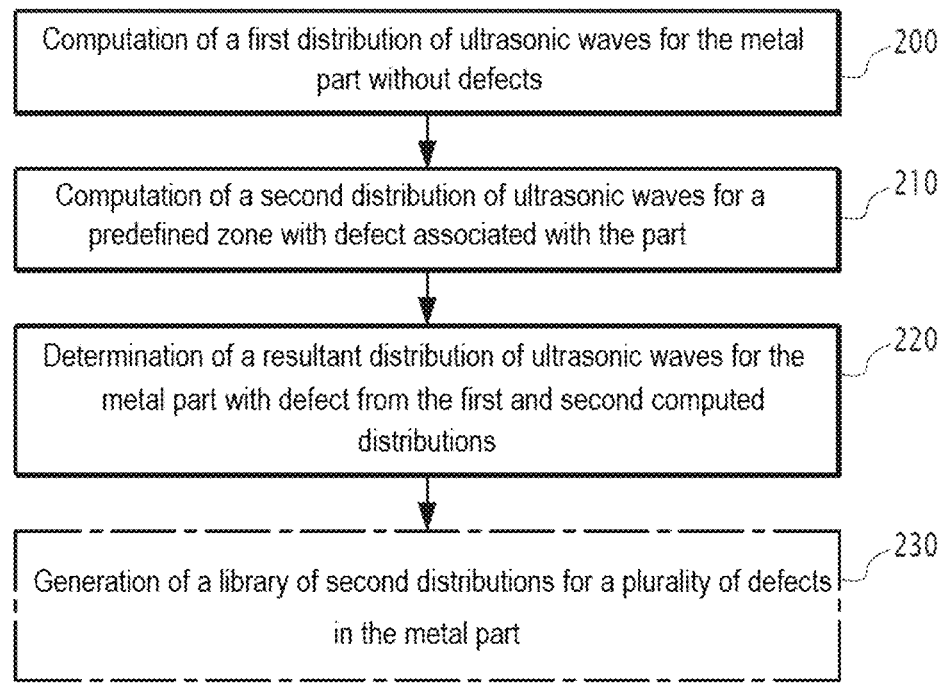
FIG. 5 is a flowchart of a method according to an embodiment of the invention for simulating an ultrasonic response of the metal part, the simulating method being used for the simulation in FIG. 4 of an ultrasonic response.

The simulation step 110 and the operation of the electronic simulating device 16 will now be explained using FIG. 5 showing a flowchart of the method, according to an embodiment of the invention, for simulating an ultrasonic response of the metal part 12.

During a sub-step 200, the electronic simulating device 16 computes, via its first computing module 40, the first distribution of ultrasonic waves for the metal part 12 with no defect.

This computation of the first distribution of ultrasonic waves for the healthy metal part 12 is known in itself, for example from the thesis by Mr. Aniss BENDJOUDI, titled "Contrôle Non Destructif ultrasonore de tubes métalliques: Modélisation, simulation, confrontation á l'experience et études parametriques>> [Nondestructive Ultrasonic Inspection of Metal Tubes: Modeling, Simulation, Comparison with Experience and Parametric Studies].

This computation of the first distribution of ultrasonic waves includes a first computation of the propagation of the ultrasonic waves in the liquid 32, such as water, on a virtual surface S2, as illustrated in FIG. 6, where the active surface of the ultrasonic sensor 15 is shown by the surface S1.

This computation of the first distribution of ultrasonic waves next includes a second computation of the propagation of the ultrasonic waves in the metal part 12, as illustrated in FIG. 7, the virtual surface S2 in this case both sending and receiving ultrasonic waves.

For this second computation, the metal part 12 is preferably broken down into successive and adjacent zones $S_3^1$, $S_3^2$, ..., $S_3^N$, that is to say, into successive zones $S_3^j$, where j is an integer index between 1 and N, and the second computation is done in a unitary manner for each successive zone $S_3^j$.

The computation of the first distribution of ultrasonic waves is then obtained by combination of the first computation of the propagation of the ultrasonic waves in the liquid 32 and the second computation of the propagation of the ultrasonic waves in the metal part 12, the first computation being done via a fast semi-analytic method and the second computation being done via a discrete method of the Finite Difference Time Domain (FDTD) type.

Figure 10:
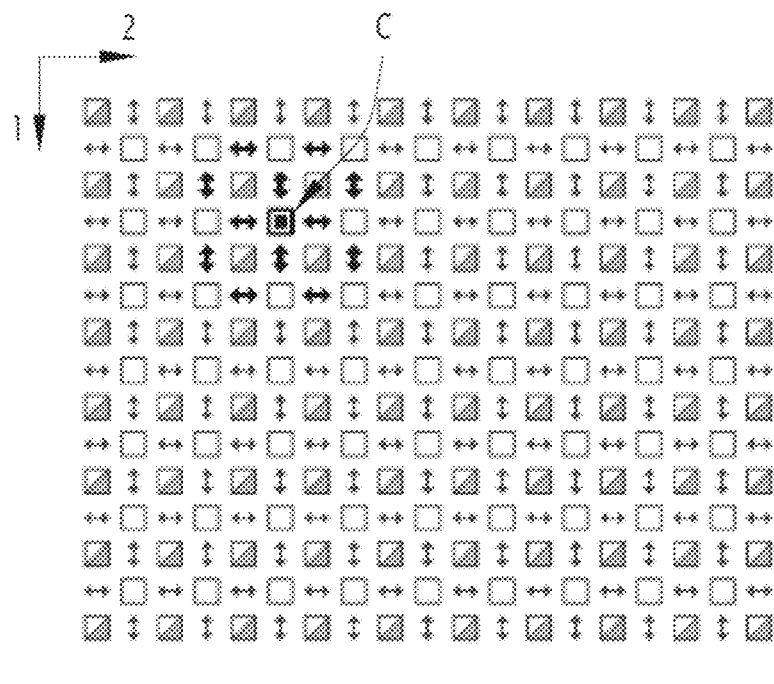
FIGS. 10 and 11, respectively, are two-dimensional views illustrating the use of a double mesh in voltage on the one hand, and speed on the other hand, for computing first and second distributions.
Figure 11:
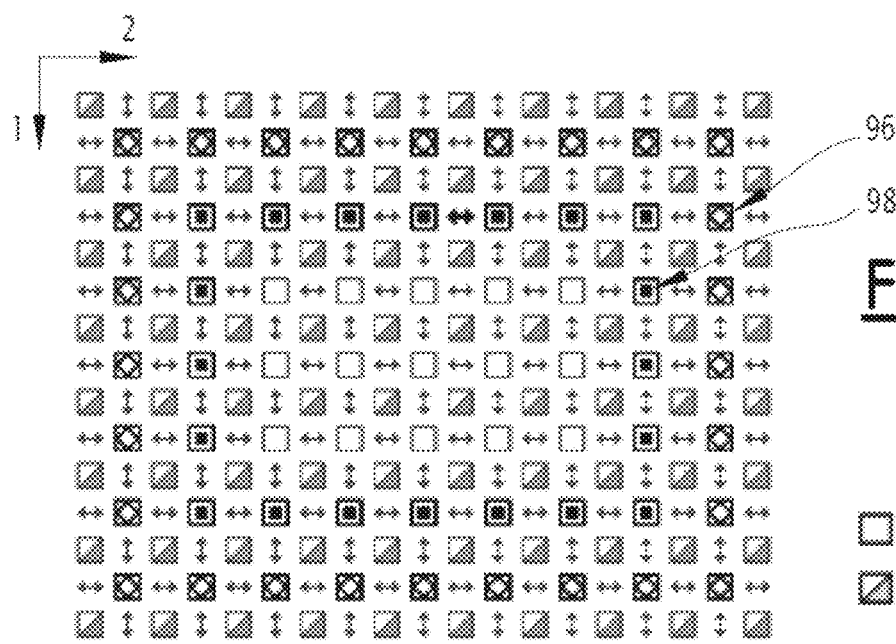

In the example of FIGS. 10 and 11, a double mesh with a first mesh M1 of constraints, or voltages, on the one hand, and a second mesh M2 of speeds, on the other hand, is used to implement this FDTD method, this double mesh being particularly suitable and effective in the case of interfaces between mediums with different mechanical properties (for example the water/metal or metal/air interface). In FIGS. 10 and 11, the constraints or voltages are shown in the form of white squares for the voltages T11 and T22, where 1 is an index associated with a first direction and 2 is an index associated with a second direction, and in the form of half white and half gray squares for the voltages T12. In these FIGS. 10 and 11, the speeds are shown in the form of two-way arrows in the direction 1 for the speeds $v_1$ and in the direction 2 for the speeds $v_2$. The first mesh M1 then corresponds to the squares of FIGS. 10 and 11, and the second mesh M2 corresponds to the two-way arrows.

FIG. 10 further shows, in the form of bold two-way arrows, the excitations necessary to compute the elementary distributions from a central point C. The computation of each elementary distribution then spreads over several points of the second speed mesh M2.

It is necessary to back up two interleaved subnetworks 96, 98, as explained hereinafter in light of FIG. 11, and the backup of each subnetwork assumes the form of a set of binary files, for example with the backup of six files for each elementary surface corresponding to the border F of a zone $S_3^j$, namely three files for the voltages and three files for the speeds.

The electronic simulating device 16 next computes, during a following sub-step 210 and via its second computing module 42, the second distribution of ultrasonic waves for the predefined zone $S_3^k$ associated with the metal part 12, the predefined zone $S_3^k$ including the defect 20 of the metal part 12, as shown in FIG. 8.

The sub-step for computing the second distribution 210 then includes computing a plurality of elementary distributions, as shown in FIG. 9, each elementary distribution corresponding to an ultrasonic response received by a receiver located at the border of the predefined zone $S_3^k$, in response to the emission of a pulsed ultrasonic excitation from an elementary source $\vec{r}$ located at the border F of the predefined zone $S_3^k$. Each elementary distribution is for example computed via the Finite Difference Time Domain (FDTD) method.

This sub-step for computing the second distribution 210 is independent of the sub-step for computing the first distribution 200. The computation of the second distribution is for example done via the preceding equation (1).

One skilled in the art will understand that the position of the elementary source $\vec{r}$ located at the border F varies from one computed elementary distribution to another, the position of the receiver located at the border F of the predefined zone $S_3^k$ conversely being unchanged from one computed elementary distribution to another. In other words, this computation of the plurality of elementary distributions amounts to performing a series of elementary simulations over a small domain, namely the predefined zone $S_3^k$, of the metal part 12 comprising the defect 20. Each elementary simulation corresponds to a different source, but with recordings in identical positions.

In the example of FIG. 11 with two interleaved subnetworks 96, 98, the first subnetwork 96 is called representation subnetwork, and is in particular the subnetwork used to apply the preceding equation (1). The second subnetwork 98 is called reciprocity subnetwork, and is in particular the subnetwork used to compute the resultant distribution $R^B(t)$ according to the preceding equations (2) and (3). The first subnetwork 96, or representation subnetwork, is shown in the form of squares with an inner diamond, and the second subnetwork 98, or reciprocity subnetwork, is shown in the form of squares with an inner square.

In FIG. 11, the first subnetwork 96, or representation subnetwork, is in the form of a first box, also called representation box, and must include all of the elementary excitations. The second subnetwork 98, or reciprocity subnetwork, which is that of the elementary excitations and is in the form of a second box, also called reciprocity box, is then for example interleaved in the representation box.

The elementary sources r for computing the plurality of elementary distributions are then points of the reciprocity subnetwork and the receivers are points of the representation subnetwork. For each elementary source $\vec{r}$, six elementary simulations are for example done, namely three elementary simulations for simulating speed sources with direction i, where the index i successively designates the three spatial directions, leading to obtaining components $H_{ni}$, and Green's functions $G_{ni}$, and three elementary simulations in order to simulate voltage sources with direction i, where the index i successively designates the three spatial directions, leading to obtaining functions similar to the components $H_{ni}$ and to the Green's functions $G_{ni}$, not for speed source, but for a voltage source. The position of the source and the nature of the source, as well as the position and the nature of the receiver, are associated with each elementary simulation.

The electronic simulating device 16 next computes, during a following sub-step 220 and via its determining module 44, the resultant distribution $R^B(t)$ of ultrasonic waves for the metal part 12 with the defect 20, from the first and second computed distributions. This resultant distribution $R^B(t)$ is for example determined from the preceding equations (2) and (3).

As an optional addition, the computations corresponding to the preceding equations (1) to (3) are done in parallel, which makes it possible to factor a large number of operations. The loading of the data is preferably optimized as well: the data of the healthy metal part 12 is loaded in full in memory, and the data corresponding to the components $H_{ni}$ and to the Green's functions $G_{ni}$ are loaded over time. Each file is read only once, and the aforementioned order allows a large-scale parallelization of the loops relative to the components $H_{ni}$ and the Green's functions $G_{ni}$. The convolutions are preferably done in the Fourier domain, which also accelerates the computations, while factoring part of the operations.

As an optional addition, the electronic simulating device 16 generates, during a sub-step 230 and via its generating module 46, the library 48 of second distributions for a plurality of defects 20 in the metal part 12 and for a plurality of orientations of the pulse ultrasonic excitation emission. This library 48 then allows a more effective identification of any defect 20 in the metal part 12 when it is inspected by the electronic inspection system 10 according to the present disclosure.

Thus, the simulating method and the electronic simulating device 16 according to the present disclosure are much more effective in computing the simulated ultrasonic response of the metal part 12 than the simulating method and the simulating device of the state of the art. As an example, for an inspection configuration and a test notch defined according to the standards of the ASTM standard, with the simulating method according to the present disclosure and on a workstation having 2×26 cores, the first distribution for the healthy part was computed in about 30 hours and the elementary distributions around the defect 20 were computed in 4 days, before the second distribution, then the resultant distribution $R_B(t)$ were determined in about 2 hours with scanning of 12×15 positions. With the simulating method of the state of the art and on the same workstation having 2×26 cores, the simulation of an equivalent ultrasonic response of the metal part 12 requires a duration of 12×15×30 hours, that is to say, 225 computing days, or a duration more than 40 times greater than that necessary with the simulating method according to the present disclosure.

The simulating method according to the present disclosure then makes it possible to improve the inspection of metal parts 12, in particular products made from zirconium alloys, such as claddings 22 designed to surround nuclear fuel pellets in the nuclear field.

One can thus see that the simulating method and the electronic simulating device 16 according to the present disclosure make it possible to decrease the time needed to compute the ultrasonic response of the metal part 12.

One skilled in the art will in particular understand that the computation of the second distribution according to the present disclosure is done over only a portion of the part, this portion being strictly smaller than said part. Indeed, this portion of the part is the predefined zone associated with the computation of the second distribution and, as previously indicated, this predefined zone for example corresponds to the sub-volume $S_3^k$. It is also indicated above that this predefined zone is typically a small domain of the metal part 12.

In other words, the computation of the second distribution according to the present disclosure differs strictly from a computation that would be done globally on the entire part, for example via a finite element method.

Furthermore, one skilled in the art could consider other methods for computing the resultant distribution, in a variant of the example of equations (2) and (3).

For example and in a variant of equations (2) and (3), the resultant distribution $R^B(t)$ is then computed according to the following equation:

$$R^B(t) = A \int_{S_c} v_1^B(t)\, dS$$

where A is a normalization constant specific to the sensor, $S_c$ is the active surface of the sensor, and $v_1^B(t)$ is the normal speed.

As another example, and in another variant of equations (2) and (3), the resultant distribution $R^B(t)$ is computed according to the following equation:

$$R^B(t) = hR^A(t) * T^B - \frac{1}{2 \cdot I_0} \int_{X1h} (ht_1^A * v_1^B - t_i^B * hv_1^A)\, dS$$

where X1h is a fictitious line between the sensor and the part, and
the properties in the integral are the components normal to this line.

As still another example, and in a variant of equation (3), while keeping equation (2), the contribution $R^{Diff}(t)$ of the defect 20 to the signal received by the ultrasonic sensor is alternatively computed according to the following equation, replacing terms A with terms B and vice versa:

$$R^{Diff}(t) = -\frac{1}{2 \cdot I_0} \int_F (ht_i^B(r',t) * v_i^A(r',t) - t_i^A(r',t) * hv_i^B(r',t)).dF$$

In the example previously described, the position of the elementary source $\vec{r}$ located at the border F of the predefined zone $S_3 k$ varies from one computed elementary distribution to another, while the position of the receiver located at the border F of the predefined zone $S_3^k$ is conversely unchanged from one computed elementary distribution to another.

One skilled in the art will then understand that as an addition with several receivers, the position of the elementary source r located at the border of the predefined zone $S_3^k$ varies from one computed elementary distribution to the other, while the positions of several receivers located at the border F of the predefined zone $S_3^k$ are unchanged from one computed elementary distribution to the other.

In a variant, the second computing module 42 implements several elementary sources arranged next to one another at the border F of the predefined zone $S_3^k$ and a single receiver located at the border F of the predefined zone $S_3^k$. The positions of the elementary sources r located at the border F of the predefined zone $S_3^k$ our then unchanged from one computed elementary distribution to the other, while the position of the single receiver located at the border F of the predefined zone $S_3^k$ varies from one computed elementary distribution to the other.

What is claimed is:

1. A method for simulating an ultrasonic response of a metal part, the method being carried out by an electronic simulating device and comprising the following steps:
   computing a first distribution of ultrasonic waves for the metal part without defect, the first distribution forming a simulation of an ultrasonic response received by an ultrasonic sensor from the metal part when the metal part does not include any defect, in response to an emission of a pulsed ultrasonic excitation toward the part;
   computing a second distribution of ultrasonic waves for a predefined zone associated with the metal part, the predefined zone including a defect of the metal part, the second distribution forming a simulation of an ultrasonic response received by the ultrasonic sensor from the predefined zone, in response to an emission of an ultrasonic excitation toward the zone, the computing of the second distribution including computing of a plurality of elementary distributions, each elementary distribution corresponding to an ultrasonic response received by a receiver located at a border of the predefined zone, in response to an emission of a pulsed ultrasonic excitation from an elementary source located at the border of the predefined zone; and determining a resultant distribution of ultrasonic waves toward the metal part including the defect, from the first and second computed distributions, the resultant distribution forming a simulation of an ultrasonic response received by the ultrasonic sensor from the metal part including the defect, in response to an emission of an ultrasonic excitation toward the part including the defect.

2. The method according to claim 1, wherein each elementary distribution is computed from a Green's transfer function over a computational domain restricted to the predefined zone, and for which the source and the receiver are located at the border of the predefined zone.

3. The method according to claim 2, wherein each elementary distribution verifies the following equation:

$$v_i^B(r, t) = \int_F (H_{ni}(r', r, t) * v_n^A(r', t) - t_n^A(r', t) * G_{ni}(r', r, t)) \cdot dF$$

where $v_i^B(r,t)$ represents a component in the direction i of the particular speed at the point r in a state B in the presence of the defect, F represents the border of the predefined zone, $H_{ni}(r',r,t)$ represents a component in the direction i of a traction vector on the border F at the point r' generated by an excitation from a speed pulse source with direction n at point r, $v_n^A(r',t))$ represents a component in direction n of the particular speed at point r' in state A, $t_n^A(r',t))$ represents a component in direction n of the traction on the border F at point r' in a state A without defect, $G_{ni}(r',r,t)$ is a Green's transfer function representing a component in the direction i of the speed at the point r' generated by an excitation from a speed pulse source with direction n at point r, and the '*' symbols represent the time convolution operator.

4. The method according to claim 1, wherein the resultant distribution is determined by applying Auld's reciprocity relation to the first and second computed distributions.

5. The method according to claim 4, wherein the resultant distribution verifies the following equation:
where $$R^{Diff}(t) = -\frac{1}{2 \cdot I_0} \int_F (ht_i^A(r', t) * v_i^B(r', t) - t_i^B(r', t) * hv_i^A(r', t)) \cdot dF$$

represents the contribution of the defect to the signal received by the sensor with $R^B(t)$ representing the electrical signal measured on reception by the sensor, for the metal part in a state B when a defect is present, $hR^A(t)$ representing the pulse response of the received electrical signal, in a state A without defect, E(t) representing the excitation electrical signal of the sensor, $ht_i^A(r',t)$ representing the pulse response for the component in a direction i of the traction on the border F at the point r', in the state A, $v_i^B(r',t)$ representing a component in the direction i of the particular speed at the point r', in the state B, $t_i^B(r',t)$ representing a component in the direction i of the traction on the border F at the point r', in the state B, $hv_i^A(r',t)$ representing the pulse response for the component in the direction i of the particular speed at the point r', in the state A, $I_0$ representing a normalization constant specific to the sensor and to an amplification system of the signal, and the '*' symbols represent the time convolution operator.

6. The method according to claim 1, further comprising generating a library of second distributions for a plurality of defects in the metal part and orientations of the pulse ultrasonic excitation emission, each second distribution being computed for a respective defect of the metal part.

7. The method according to claim 1, wherein the metal part is a cladding designed to surround nuclear fuel pellets in a nuclear reactor core.

8. A non-transitory computer-readable medium including a computer program comprising software instructions which, when executed by a computer, carry out the method according to claim 1.

9. A method for inspecting a metal part, comprising the following steps:

determining an ultrasonic response of the metal part, via an ultrasonic sensor;

simulating ultrasonic response of the metal part, via the implementation of the method according to claim 1; and identifying any defect in the metal part by comparison of the determined and simulated ultrasonic responses of the metal part.

10. An electronic simulating device for simulating an ultrasonic response of a metal part, the electronic simulating device comprising:

a first computing module configured to compute a first distribution of ultrasonic waves for the metal part without defect, the first distribution forming a simulation of an ultrasonic response received by an ultrasonic sensor from the metal part when the metal part does not include any defect, in response to an emission of an ultrasonic excitation toward the part;

a second computing module configured to compute a second distribution of ultrasonic waves for a predefined zone associated with the metal part, the predefined zone including a defect of the metal part, the second distribution forming a simulation of an ultrasonic response received by the ultrasonic sensor from the predefined zone, in response to an emission of an ultrasonic excitation toward the zone, the second computing module being configured to compute a plurality of elementary distributions, each elementary distribution corresponding to an ultrasonic response received by a receiver located at a border of the predefined zone, in response to the emission of an ultrasonic excitation from an elementary source located at the border of the predefined zone; and a determining module configured to determine a resultant distribution of ultrasonic waves toward the metal part including the defect, from the first and second computed distributions, the resultant distribution forming a simulation of an ultrasonic response received by the ultrasonic sensor from the metal part including the defect, in response to the emission of an ultrasonic excitation toward the metal part including the defect.

11. An electronic system for inspecting a metal part, the electronic inspection system comprising:
   an electronic determining device configured to determine an ultrasonic response of the metal part, from an ultrasonic sensor;
   the electronic simulating device according to claim 10;
   an electronic identification device configured to identify any defect in the metal part by comparison of the determined and simulated ultrasonic responses of the metal part.

* * * * *